(12) United States Patent  
Gross

(10) Patent No.: US 6,475,326 B2  
(45) Date of Patent: Nov. 5, 2002

(54) ANODIC BONDING OF A STACK OF CONDUCTIVE AND GLASS LAYERS

(75) Inventor: Harald S. Gross, Fremont, CA (US)

(73) Assignee: Applied Materials, Inc., Santa Clara, CA (US)

(*) Notice: Subject to any disclaimer, the term of this patent is extended or adjusted under 35 U.S.C. 154(b) by 0 days.

(21) Appl. No.: 09/739,078

(22) Filed: Dec. 13, 2000

(65) Prior Publication Data

US 2002/0069960 A1 Jun. 13, 2002

(51) Int. Cl.[7] .............................................. B32B 31/00
(52) U.S. Cl. ........................ 156/272.2; 156/273.9; 156/274.4; 65/59.1
(58) Field of Search .................... 156/272.2, 273.9, 156/274.4; 65/36, 40, 59.1

(56) References Cited

U.S. PATENT DOCUMENTS

| 4,609,968 A | 9/1986 | Wilner .................. 361/320 |
| 4,802,952 A | 2/1989 | Kobori et al. ............. 156/634 |
| 5,141,148 A | 8/1992 | Ichiyawa ................. 228/263 |
| 5,411,919 A | 5/1995 | Inada ..................... 437/209 |
| 5,528,070 A | 6/1996 | Cahill .................... 257/419 |
| 5,783,309 A | 7/1998 | Faure et al. .............. 428/432 |
| 5,938,911 A | 8/1999 | Quenzer et al. ............ 205/114 |

FOREIGN PATENT DOCUMENTS

| DE | 4136075 | 5/1993 | .......... H01L/21/58 |
| JP | 2141442 | 5/1990 | .......... C03C/27/00 |

OTHER PUBLICATIONS

S. Shoji et al., "Anodic Bonding Below 180°C for Packaging and Assembling MEMS Using Aluminosilicate–β–quartz Glass–Ceramic", IEEE Document No. 0–7803–3744–1/97.

Primary Examiner—Michael W. Ball  
Assistant Examiner—John T Haran  
(74) Attorney, Agent, or Firm—Shirley L. Church

(57) ABSTRACT

We have developed a method of anodic bonding which directs cations to a location within a bonding structure which is away from critical bonding surfaces. This prevents the formation of compounds comprising the cations at the critical bonding surfaces. The anodic bonding electrode contacts are made in a manner which concentrates the cations and compounds thereof in a portion of the bonded structure which can be removed, or cleaned to remove the compounds from the structure. A device formed from the bonded structure contains minimal, if any, of the cation-comprising compounds which weaken bond strength within the structure. In the alternative, the cations and compounds thereof are directed to a portion of the bonding structure which does not affect the function of a device which includes the bonded structure.

34 Claims, 4 Drawing Sheets

ANODIC BONDING OF A STACK OF CONDUCTIVE AND GLASS LAYERS

FIELD OF THE INVENTION

The present invention relates to a method of bonding alternating conductive and glass layers. More particularly, the method pertains to anodic bonding of stacks of alternating conductive and glass layers, where the conductive layer is a metal or semiconductor. The invention has applicability, among other areas, in the formation of such stacks for microcolumns in electron optics, including electron microscopes and lithography apparatus, in the formation of micro electromechanical structures (MEMS), and also in micro opto-electromechanical structures (MOEMS).

BACKGROUND OF THE INVENTION

Stacks of alternating layers of conductive material and glass find use in a number of practical applications such as in electron optics and micro electromechanical structures. Anodic bonding has been one of the techniques used to bond the conductive layer to the glass layer. In some instances, a semiconductor material such as silicon is used as the conductive layer, and the glass layer is a borosilicate glass, such as PYREX® (Corning Glass, Corning, N.Y.) or BOROFLOATO® (Schott Glass Technologies, New York, N.Y.). In the alternative, the glass layer may be a lithium aluminosilicate -β-quartz glass-ceramic such as Prototype PS-100 available from HOYA Co., Tokyo, Japan. The advantage of this latter glass is that anodic bonding may be performed at a temperature below about 180° C.

A detailed description of use of the HOYA Co. Lithium aluminosilicate -β-quartz glass-ceramic glass is provided in a publication by Shuichi Shoji et al. entitled: "Anodic Bonding Below 180° C. For Packaging And Assembling Of MEMS Using Aluminosilicate-β-quartz Glass-Ceramic", available form IEEE as document 0-7803-3744-1/97, the subject matter of which is hereby incorporated by reference in its entirety. In particular the bonding of Prototype PS-100 glass-ceramic pieces 370 μm thick to silicon wafers was achieved using anodic bonding at a temperature ranging from about 140° C. to about 180° C., at an applied DC voltage ranging from about 300 V to about 700 V, over a time period of about 10 minutes or less. A comparison is made for bonding the Prototype PS-100 glass relative to #7740 Corning PYREX® glass and relative to #SD-2 HOYA Bonding Glass. In all cases, a single layer of glass is bonded to a layer of silicon.

One conventional approach to anodic bonding is shown in FIG. 1. In this Figure, conductive layers (silicon layers, by way of example) 108, 110, 112, and 114 are alternated with electrically insulating layers (borosilicate glass, by way of example) 107, 109, and 111. The stack 100 of alternating silicon and glass layers is placed upon a hotplate 106, which provides both a source of heat input and electrical grounding. Electrical contact 102 is contacted to uppermost silicon layer 108, while electrical contact 104 is contacted to the hotplate 106. Silicon layer 108 acts as the upper electrode, while silicon layer 114/hotplate 106 acts as the lower electrode. Heat is applied to the hotplate 106 and a voltage is applied between the electrodes 108 and 114/106, through all of the layers to be bonded. The heated glass acts as an electrochemcial cell and permits the transfer of current through the borosilicate glass layers 107, 109, and 111. The application of the voltage causes ionized sodium and oxygen to move within the glass and promotes bonding of silicon layer surfaces to glass layer surfaces.

Looking at the process in a little more detail, anodic bonding has been accomplished using either DC voltage or AC voltage. Accordingly, for purposes of the following description, the voltage source in FIG. 1 is shown in conceptual, rather than structural form.

In the DC voltage technique, a negative DC potential is applied between electrodes 108 and 114/106, followed by application of reverse polarity DC potential between the electrodes 108 and 114/106.

When, for example, electrode 114/106 is at ground potential, and electrode 108 is at a negative potential, oxygen ions travel toward surface 132 of glass layer 107; surface 134 of glass layer 109; and, surface 136 of glass layer 111. This enables the covalent bonding of oxygen to silicon at surface 132 between glass layer 107 and silicon layer 110; at surface 134, between glass layer 109 and silicon layer 112; and, at surface 136, between glass layer 111 and silicon layer 114. Simultaneously, application of the DC voltage in this manner causes sodium ions that are part of the glass layers to move toward the opposite surface of each glass electrochemical cell. For example, sodium ions move toward surface 131 of glass layer 107; surface 133 of glass layer 109; and, surface 135 of glasslayer 111.

The series connection of the electrochemical cells creates a potential gradient over the entire stack. Since current flows throughout the stack 100, from top electrode 108 to bottom electrode 114/106, each silicon layer acting as an electrode, the electrode surface includes the entire major surface of each of the stacked silicon layers.

After application of the DC potential in this fashion, in the next step in the anodic bonding process, the voltage is reversed, such that electrode 114/106 is at a negative potential, and electrode 108 is at ground. This permits oxygen ions to move within glass layer 107 toward surface 131; within glass layer 109 toward surface 133; and within glass layer 111 toward surface 135. However, the covalent bonding of the oxygen to the silicon at surfaces 131, 133, and 135 is weaker due to the presence of the sodium compounds 120, 122, and 124, respectively, which form due to the movement of sodium ions toward these surfaces during the bonding process. Simultaneously with the covalent bonding of surfaces 131, 133, and 135, sodium compounds 126, 128, and 130 form at surfaces 132, 134, and 136 of glass layers 107, 109, and 111, respectively, weakening the bond between these glass surfaces and the mating silicon surfaces.

In view of the weakened bonds formed at silicon surfaces 131, 133 and 135, as described above, an AC voltage anodic bonding technique was devised. By applying an AC voltage, voltage polarities are reversed continuously, thus achieving bonding between all adjoining surfaces of consecutive layers. By applying AC voltage, the concentration of sodium at each interface during bonding is gradually increased during the bonding period. This means the amount of sodium contamination is lower at the beginning of the bonding process, which better facilitates bonding. However, by the end of the process the sodium contamination has reached a significant level, and the overall bond strength between the alternating layers may not be adequate for some applications.

In view of the foregoing deficiencies, it would be desirable to be able to bond semiconductor and glass layers anodically, without the concentration of sodium and sodium compounds at the interface of bonding layers.

SUMMARY OF THE INVENTION

We have developed a method of anodic bonding which directs cations to a location within a bonding structure which is away from critical bonding surfaces. This prevents the formation of compounds comprising the cations at the critical bonding surfaces. The anodic bonding electrode contacts are made in a manner which concentrates the cations and compounds thereof in a portion of the bonded structure which can be removed, or cleaned to remove the compounds from the structure. A device formed from the bonded structure contains minimal, if any, of the cation-comprising compounds which weaken bond strength within the structure. In the alternative, the cations and compounds thereof are directed to a portion of the bonding structure which does not affect the function of a device which includes the bonded structure.

BRIEF DESCRIPTION OF THE DRAWINGS

The foregoing and other aspects of the invention will be appreciated from the following detailed discussion, provided in conjunction with the accompanying drawings, in which.

DETAILED DESCRIPTION OF PREFERRED EMBODIMENTS

As a preface to the detailed description, it should be noted that, as used in this specification and the appended claims, the singular forms of "a", "an", and "the" include plural referents, unless the context clearly dictates otherwise. Thus, for example, the term "a semiconductor" includes a variety of different materials which are known to have the behavioral characteristics of a semiconductor; reference to "a metal" includes, for example, aluminum, aluminum alloys, copper, copper alloys, tungsten, tungsten alloys, iridium, iridium alloys, platinum, platinum alloys, and other conductive materials which would be suitable in the application described.

Figure 1:
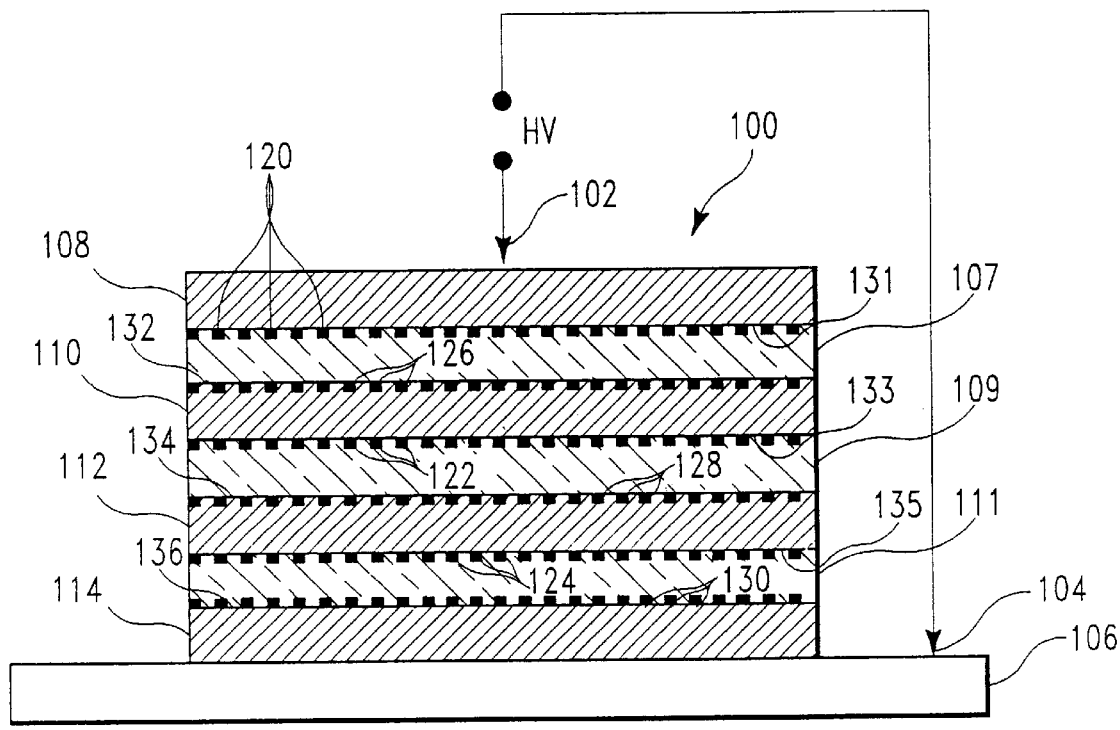
FIG. 1 shows a schematic of a cross-section of layers bonded using a conventional anodic bonding approach.

We have discovered that during the anodic bonding of a glass layer to a conductive layer, undesirable sodium compounds form on a glass surface which is in contact with a surface acting as a negative electrode. The extent of this compound formation is so pervasive as to cause major bonding problems, and to even prevent bonding in some instances. With reference to FIG. 1, once again, the sodium ions which have moved to glass layer surfaces during an anodic bonding process react with ambient materials found at the glass surface, forming sodium compounds such as sodium hydroxide or sodium carbonate. These compounds are shown in FIG. 1 as black boxes 120 on glass surface 131; black boxes 126 on glass surface 132; black boxes 122 on glass surface 133; black boxes 128 on glass surface 134; black boxes 124 on glass surface 135; and, black boxes 130 on glass surface 136. Because sodium is so reactive, such compounds form readily.

As previously described, in the bonding process where DC potential is applied, bonding is achieved in two steps. In the first step, for example, with silicon layer 108 acting as a negative electrode, bonding is achieved at glass surfaces 132, 134, and 136; and then, in a second step, the potential is reversed to achieve bonding at glass surfaces 131, 133, and 135. During the first step, sodium compounds 120, 122, and 124 form over the entire major surfaces 131, 133, and 135 of the borosilicate glass layers 107, 109, and 111, respectively. During the second bonding step, because of the presence of these sodium compounds on the glass surfaces 131, 133, and 135, bonds which are formed are very weak. For microcolumn applications, for example, those bonds may be so weak as to be ineffectual. In addition, the formation of sodium compounds on the entire major surfaces 132, 134, and 136 of glass layers 107, 109, and 111 during the second bonding step weakens the bonds previously formed at these glass surfaces.

The strength of the bond achieved may be adequate for some applications, but the presence of sodium compounds formed at the various bonding surfaces and at adjacent surfaces to which sodium migrates (due to concentration gradients) may cause severe device performance problems. For example, when sodium reacts with water in the air, it forms sodium hydroxide, a highly corrosive compound which can react with silicon and other materials and cause damage. In some electro-optical applications, where there is a thin silicon membrane at a glass interface, the sodium hydroxide may etch completely through the membrane. In electronic circuits, sodium may react with doped silicon in a transistor device, eventually causing a short in the device.

Due to our discovery of how extensive and pervasive the sodium compounds were, it was critical to develop a method of anodic bonding in which the undesirable sodium compounds are directed toward an area of the bonding structure which is away from critical bonding surfaces. Preferably, the sodium compounds are concentrated at a location within the bonding structure which can be removed from the bonded structure, or where the compounds can be cleaned from the glass surface.

The method of the invention is, in fact, generally applicable to the bonding of any two layers where an electrochemical cell can be formed between the two layers; and, although the invention is described with respect to the bonding of a glass to a conductive layer, one skilled in the art, after reading this disclosure, will understand that another, second material (other than a glass as it is commonly defined) may be substituted for the glass, so long as the second material is capable of performing the function necessary to permit anodic bonding. The second material should provide the effective formation of an electrochemical cell during the bonding process. Glass has been known to be well-suited for this purpose, because it contains charge transfer ions which facilitate the formation of electrochemical cells and enable the anodic bonding process. However; it is within the contemplation of the invention that other suitable materials capable of enabling the formation of electrochemical cells, including materials which may be devised in the future, may be used.

In addition to constraints related to the formation of an electrochemical cell, there are thermal constraints, i.e. the second material should have thermal expansion characteristics that compare favorably to those of the conductive material to which the second material is bonded.

Electrodes used in the anodic bonding process are contacted with layers to be bonded in a manner such that cations and compounds thereof are concentrated in a portion of the bonded structure which can be removed, or cleaned to remove the compounds from the structure. In the alternative, the cations and compounds thereof are directed to a portion of the bonded structure which does not affect the function of a device which includes the bonding structure.

For example, in applications where a wafer-sized structure is bonded and chips are later diced out of the wafer, the electrode contact areas can be removed during the dicing operation. In applications where a chip-sized structure is bonded, the electrode contact areas can be designed to be accessible to a water rinse for removal of sodium compounds. In the alternative, depending on the device and the probability for subsequent harm to device performance, the electrode contact areas may be placed at the edge of a chip stack.

In one particularly useful embodiment of the invention, alternating semiconductor (or metal) and glass layers in a stack are anodic bonded by contacting electrodes to consecutive layers in the stack, rather than contacting electrodes only to the top and bottom layers of the stack. With this technique, there are two effects. First, the glass electrochemical cells are in parallel, rather than in series. A second, attendant effect is that there is no longer a potential gradient throughout the stack. Instead, the only potential gradient is between consecutive layers.

Because of these effects, sodium compounds, which form from sodium ions generated within the glass during the anodic bonding process, only form in the vicinity of the electrodes, rather than across the entire major surfaces of the layers. In particular, the semiconductor or metal layers no longer act as electrodes themselves. As a result, the bonding between the semiconductor (or metal) and glass layers is relatively unaffected by the presence of sodium compounds.

In one variation of the embodiment, each layer is contacted separately, with separate electrode contacts. In another variation, larger, extended electrodes are used to contact respective types of layers. The electrodes may contact a limited area on a major surface or may contact a minor surface of the associated layers.

Figure 2:
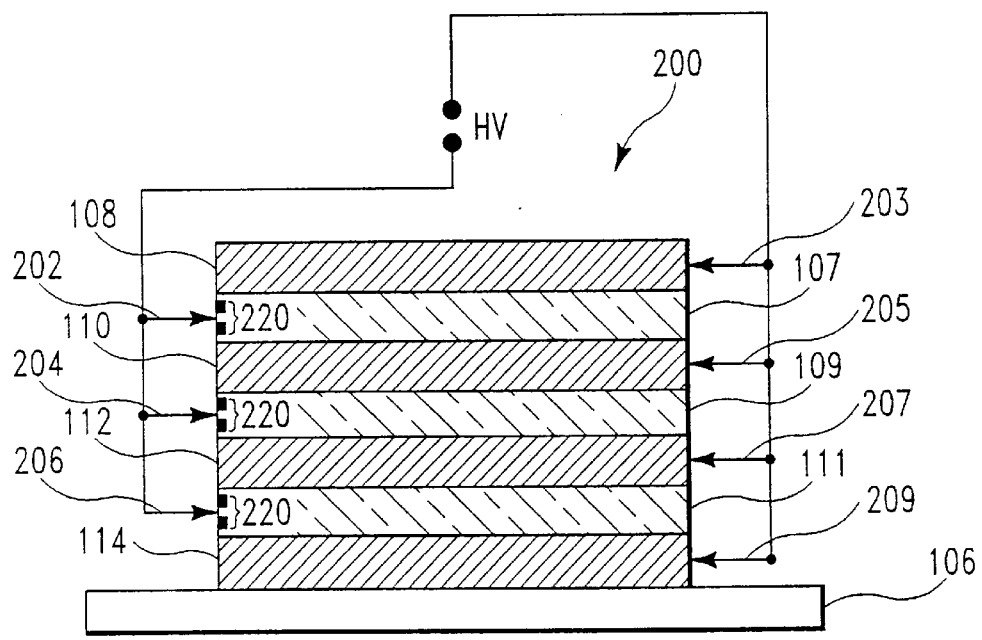
FIG. 2 shows a schematic of a cross-section of layers bonded in accordance with one embodiment of the invention.

Referring now to FIG. 2, which illustrates one embodiment of the invention, electrodes 203, 205, 207, and 209 contact respective silicon layers 108, 110, 112, and 114; while electrodes 202, 204, and 206 contact respective glass layers 107, 109, and 111. While the electrodes are shown conceptually as contacting a minor surface of the layers, in fact, as will be explained below, the electrodes may contact either a limited portion of a major surface or a minor surface of the layers. The shape of the electrodes is not significant for purposes of explaining the principles underlying the invention, and so the electrodes are shown in schematic, rather than structural form.

With respect to FIG. 2, when a negative potential is applied between the silicon layers and the glass layers, the following electrochemical cells are formed: a first cell comprises layers 108, 107, and 110; a second cell comprises layers 110, 109, and 112; and a third cell comprises layers 112, 111, and 114. With the depicted arrangement, because a separate electrodes contact each of the layers, the electrochemical cells are formed in parallel, rather than in series. With this parallel configuration, all of the bonding of the layers occurs in a single step of applying a negative potential. In each of these cells, of course, there is an electrical potential, but there is no potential gradient across the entire stack, because the resulting electrochemical cells are formed in parallel, rather than in series. The formation of electrochemical cells in this manner prevents the major surfaces of silicon layers 108, 110, 112, and 114 from acting as negative electrodes where sodium compounds are formed. Consequently, sodium compounds will not form across the interfaces between the silicon and glass layers. The compounds may form where the electrodes contact these various layers, but bonding between the layers (which occurs at the major surfaces of the layers) will not be affected by the sodium compounds formed at the electrode contact points.

In accordance with the method of the invention, when the glass layer being bonded is PYREX®, the hotplate 106 is heated, for example, to a temperature between about 300° C. and about 5000° C. (other temperatures also may be suitable, depending on the particular glass used). A DC voltage of, for example, from −0.2 kV to −2.0 kV, is provided to the glass layers, with the silicon layers being grounded. Excellent results have been obtained for voltages within the range of −0.3 kV to −1.0 kV. The foregoing voltage is exemplary; what matters more is that there is a negative potential difference between the silicon layers and the glass layers, i.e., the silicon layers should be at a higher potential than the glass layers. In one experiment, in which five silicon layers and four interleaved glass layers were bonded in a single 6 mm ×6 mm chip stack, a satisfactory bonding of the layers was achieved using −0.5 kV at about 450° C. for a time period of about 5 minutes. In another experiment, where five silicon layers and four interleaved glass layers were bonded in a single 4 inch diameter wafer stack, a satisfactory bonding of the layers was achieved using −1.0 kV at about 400° C. for a time period of about 30 minutes. Factors which must be considered in determining the amount of time which will be required for bonding include, but are not limited to, the applied voltage, the temperature of the substrate, the surface area of the contact electrode, the glass surface area to be bonded in combination with the geometry of the glass electrical contact surface area, and the distance ions must travel to promote the bonding.

It is important to mention that the applied voltage is independent of the number of layers in the stack. In fact, the number of layers in the stack may vary as desired. For the sake of achieving the goal of avoiding formation of sodium compounds, bonding should be effected among at least two layers of a first material, and an interleaved layer of a second material. There could be two layers of semiconductor or metal, and an interleaved layer of glass; or there could be two layers of glass, and an interleaved layer of semiconductor or metal. The application of an appropriate potential is based on the sequencing of the layers.

The inventive technique contrasts with the technique previously described with reference to FIG. 1. For example, a relatively higher voltage, for example, −2 kV was applied on the upper silicon layer 108 of stack 100 for a time period of about 5 minutes at a stack temperature of about 450° C., followed by reversal of the potential to +2 kV for a period of about 15 minutes. During application of the −2 kV to silicon layer 108, glass surfaces 131, 133 and 135 were bonded to the silicon layer surfaces with which they were in contact. However, simultaneously, undesirable silicon compounds were formed on glass surfaces 132, 134, and 136. Upon reversal of the voltage to +2 kV, sodium compounds were formed on the already bonded interfaces including glass surfaces 131, 133, and 135. In addition, due to the presence of undesirable silicon compounds on glass surfaces 132, 134, and 136, only a weak bond was formed between these glass surfaces and the silicon layer surfaces with which they were in contact. The longer the period of time required for the first bonding process, the higher the probability that a good bond will not be obtained in the second bonding process. We observed that even longer bonding times, higher bonding temperatures and the use of higher voltages did not provide acceptable bonding during the second bonding process in many instances.

As previously mentioned, use of an alternating current rather than a reversing DC current may reduce the probability of bonding failures, but this technique is still inferior to the technique of the present invention as illustrated in FIG. 2, for example.

It also should be noted that, unlike the technique depicted in FIG. 1, wherein reverse polarity is applied, in the technique shown in FIG. 2, voltage polarity is not reversed. Polarity reversal is unnecessary because the parallel connection of the electrochemical cells effects bonding between all adjacent layers.

In FIG. 2, each of the electrodes 203, 205, 207, and 209, as well as 202, 204, and 206 is shown as contacting a minor surface of its respective layer. However, the invention is not so limited. The electrodes also may contact a limited portion of a major surface of a respective layer, while still achieving the salutary effects of the invention. Contact to major surfaces may be accomplished, for example, through the provision of suitable through holes in the appropriate layers, to ensure that proper electrode contact can be made with each layer.

Figure 3A:
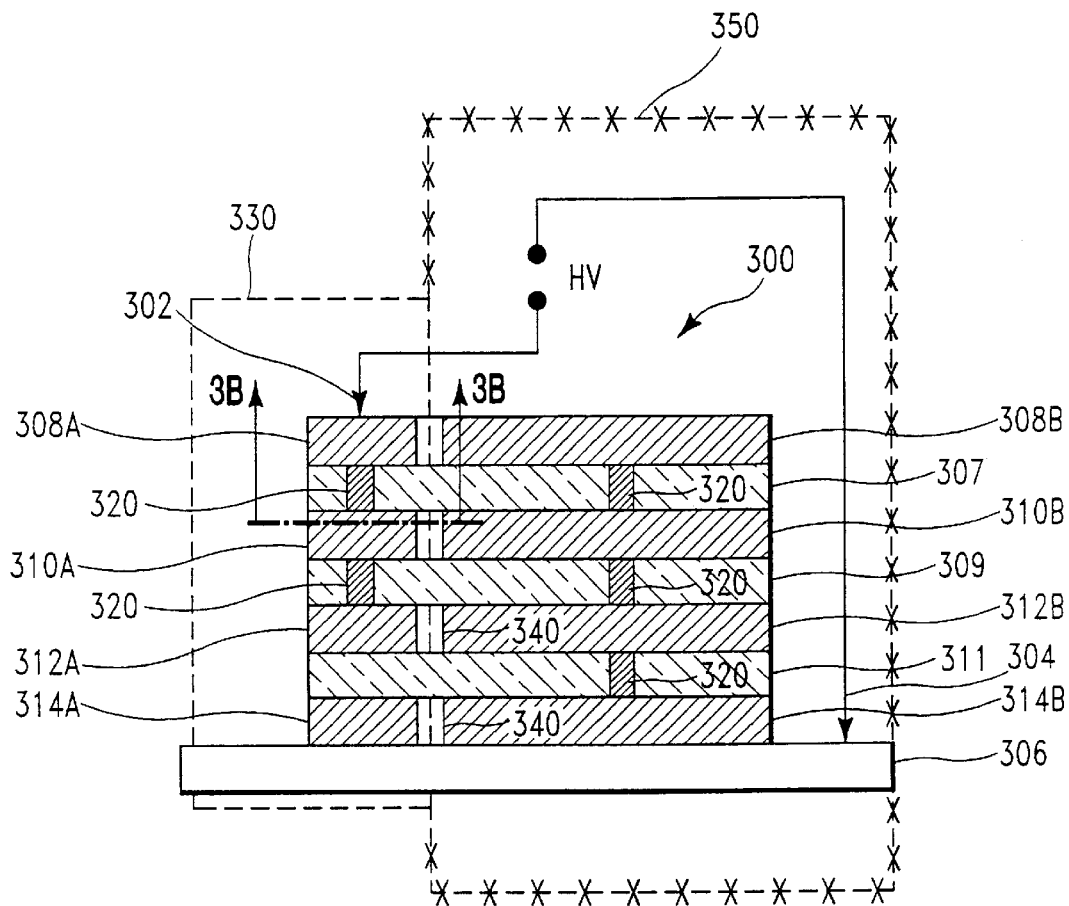
FIG. 3A shows a schematic of a cross-section of a stack of layers bonded in accordance with a second embodiment of the invention.
Figure 3B:
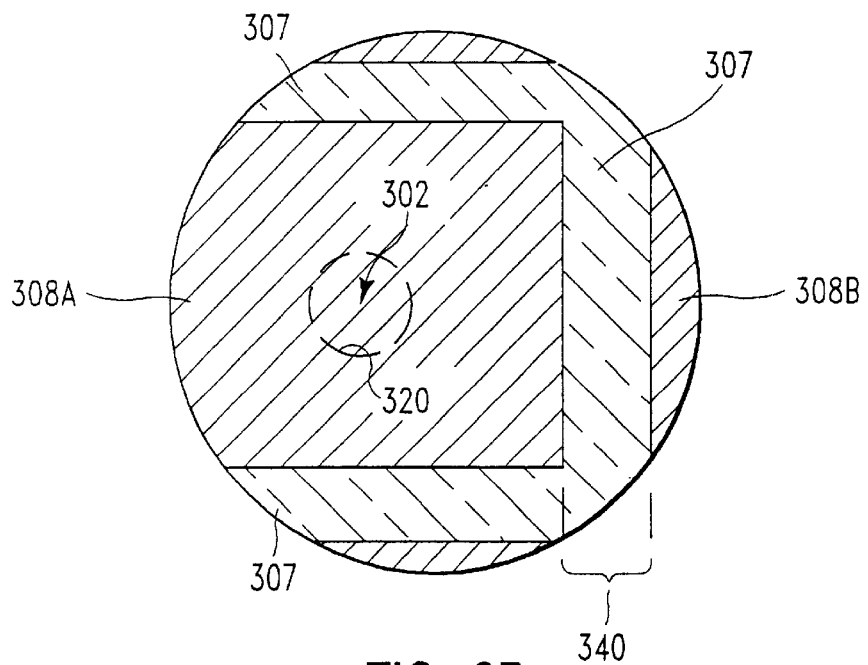
FIG. 3B shows a schematic of a enlarged top view of a portion of the upper surface of the stack of layers shown in FIG. 3A.

FIGS. 3A and 3B show an alternate approach, which may be used in a circumstance in which it is difficult to contact all of the layers separately. As shown in FIG. 3A, gaps 340 are formed in the silicon layer portions 308A, 310A, 312A, and 314A. As illustrated in FIG. 3B, with respect to the upper silicon layer 308, gaps 340 are used to separate silicon layer 308 into silicon layer portions 308A and 308B. Electrical feedthroughs 320 are provided through glass layers 307, 309, and 311, as shown; these glass layers are continuous and do not include gaps. As illustrated by the combination of FIG. 3A and FIG. 3B, the provision of gaps 340 in portions of silicon layer 308 and in underlying silicon layers 310, 312, and 314, produces silicon layer portions 308A, 310A, 312A, and 314A, which creates a "block via" 330. By contacting an electrode 302 to the uppermost silicon layer portion 308A of the block via 330, it is possible to contact all of the glass layers 307, 309, and 311, achieving the same result as in the FIG. 2 configuration. In this fashion, the block via 330 acts as an electrical feedthrough inside the stack 300. The block via 330 should be separated from the rest of the silicon-glass structure. This is because, when the DC voltage is applied, the electrode contacts shown in FIG. 3 will cause sodium compounds (not shown) to form throughout the interfaces between the silicon layer portions 308A, 310A, 312A, and 314A which are shown within block via 330 and the interfacing glass layers. However, because this block via 330 will have no function in the stack 300 other than to provide for electrode contact, weak bonding in this block via 330 will be irrelevant. All that is necessary to achieve this result is that the silicon layers in block via 330 make no electrical contact with any of the remaining portions of the silicon layers, 308B, 310B, 312B, and 314B, which make up the device structure stack 350. Simultaneously, the block via 330 enables contact to all of the glass layers at once. As illustrated, all of the silicon layer portions are electrically connected by the electrical feedthroughs 320 to the bottom of the stack 300 which is setting on hotplate 306. In this fashion, parallel connection of the electrochemical cells, is accomplished when the DC voltage is applied.

Using the technique shown in FIG. 3, formation of sodium compounds will occur on the layer interfaces of the block via 330 portion of stack 300, which is outside of the device stack 350. In the case where the device stack 350 is used in an electron optics microcolumn, this sodium compound formation will not have an adverse effect on the function of the microcolumn.

Figure 4A:
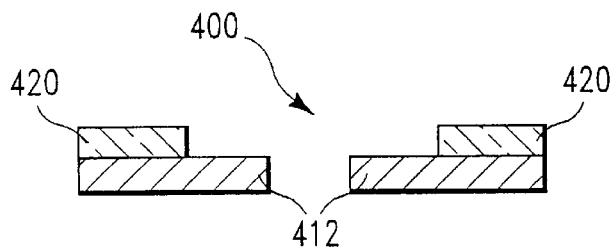
FIGS. 4A and 4B show a schematic of a cross-section of a starting stack of pre-bonded layers and the same stack after a third layer has been bonded (using a conventional anodic bonding method), respectively.
Figure 4C:
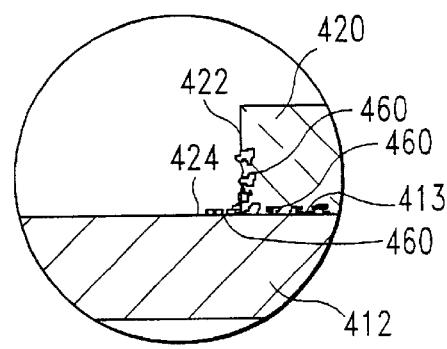
FIG. 4C shows an enlargement of a bonded area of FIG. 4B, for purposes of showing an area in which sodium accumulates during bonding, leading to the formation of undesirable sodium compounds.
Figure 4B:
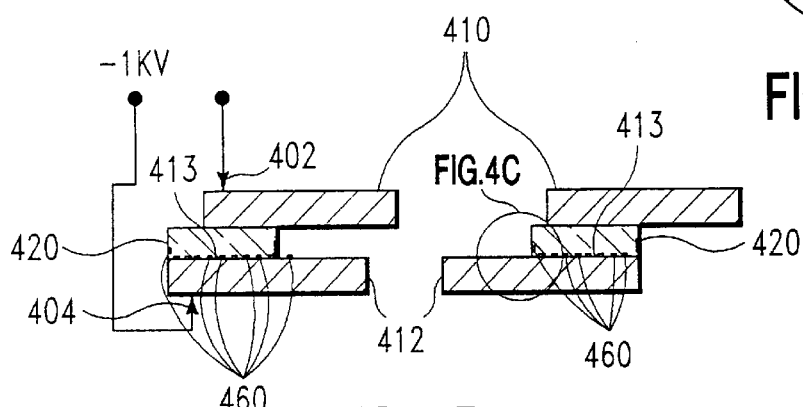

FIG. 4A shows a schematic of a cross-section of a two layer pre-bonded stack 400 of a silicon layer 412 and a glass layer 420. These layers were pre-bonded using a technique which permitted residual sodium compounds to be washed away. This pre-bonded stack 400 served as a starting point for the investigation of the migration of silicon during a bonding process. FIG. 4B shows bonding stack 400 after the overlaying of an upper layer of silicon, 410, with subsequent anodic bonding using a conventional method for purposes of bonding upper silicon layer 410 to glass layer 420. A negative electrode contact 404 is applied to lower silicon layer 412 and a positive electrode contact 402 is applied to upper silicon layer 410. Sodium compounds 460 have accumulated at the interface 413 between the upper surface of lower silicon layer 412 and lower surface of overlying glass layer 420 during the bonding process. In addition sodium compounds 460 have formed in adjacent regions, along the edge 422 of glass layer 420 and along exposed surface 424 of lower silicon layer 412, as illustrated in FIG. 4C (which shows an enlarged area of FIG. 4B). The accumulation of sodium compounds 460 along the edge 422 of glass layer 420 and along the exposed surface 424 of lower silicon layer 412 is due to a sodium concentration gradient relative to adjacent surface 413.

Figure 5A:
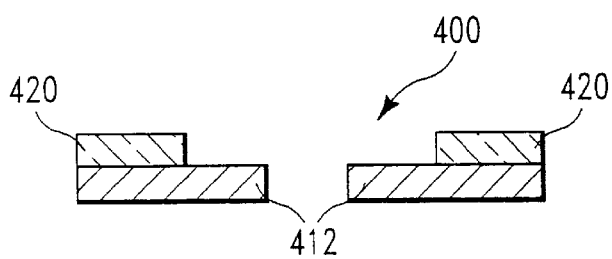
FIGS. 5A and 5B show a schematic of a cross-section of a starting stack of pre-bonded layers and the same stack after a third layer has been bonded (using a technique in accordance with the invention), respectively.
Figure 5C:
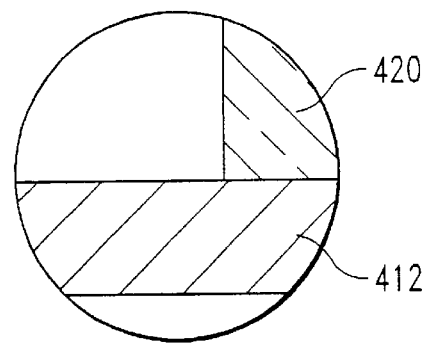
FIG. 5C shows an enlargement of a bonded area of FIG. 5B, for purposes of showing the absence of sodium accumulations during bonding, for purposes of comparison with FIG. 4C.
Figure 5B:
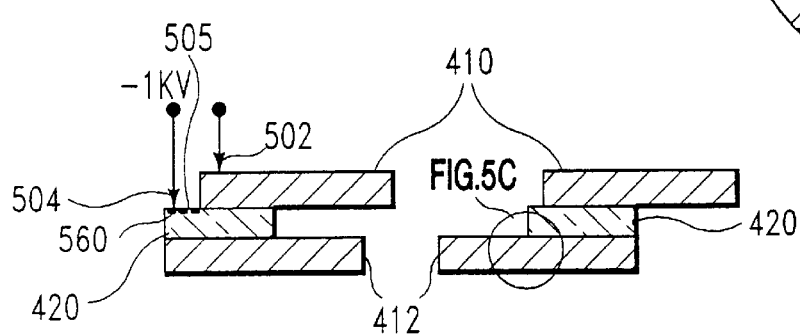

FIG. 5A shows a schematic of a cross-section of a two layer pre-bonded stack 400 of a silicon layer 412 and a glass layer 420. These layers were pre-bonded using a technique which permitted residual sodium compounds to be washed away. FIG. 5B shows bonding stack 400 after the overlaying of an upper layer of silicon, 410, with subsequent anodic bonding using one bonding technique of the present invention. In particular, a negative electrode contact 504 is applied to an upper surface 505 of glass layer 420, and a positive electrode contact 502 is applied to upper silicon layer 410. Sodium compounds 560 have accumulated only at the upper surface 505 of glass layer 520 in the area of negative electrode contact 504. These sodium compounds 560 can easily be washed away. In this embodiment of the invention, the negative electrode contact 504 can be placed on a portion of the glass layer which avoids sodium compound formation in critical regions, as illustrated in the FIG. 5C enlargement of a bonding area from FIG. 5B.

Figure 6:
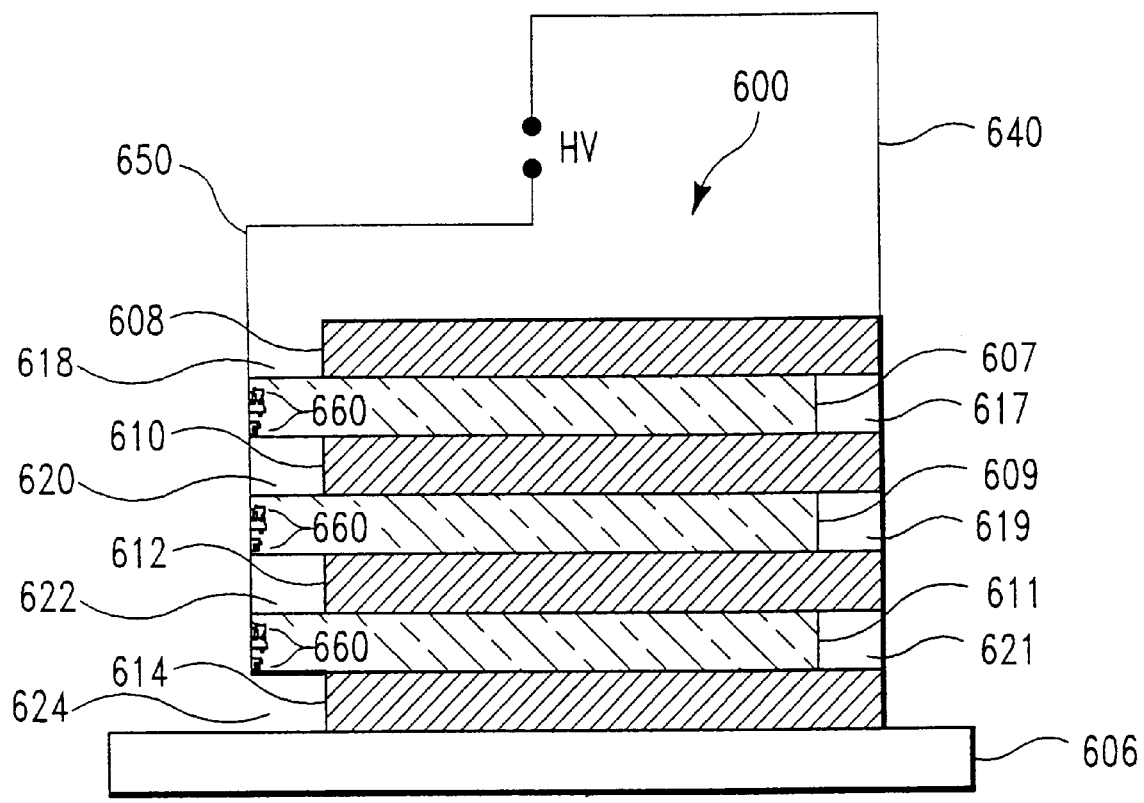
FIG. 6 shows a schematic of a cross section of layers bonded using the method of the invention where extended electrodes which contact respective types of layers are employed.

FIG. 6 shows a further embodiment of the invention. In this embodiment, silicon wafers 608, 610, 612, and 614 have been stacked in an offset manner relative to glass layers 607, 609, and 611. This leaves open spaces 618, 620, 622, and 624, respectively, on one side of the stack 600 and open spaces 617, 619, and 621 on the opposite side of stack 600. FIG. 6 shows a schematic of a cross-section of the silicon and glass wafers, so that only a portion of the offset pattern is shown..

Separate extended electrodes 640 and 650, which may be any desired conductive material, are then used in the manner shown, so that extended positive electrode 640 contacts only silicon layers 608, 610, 612, and 614, while extended negative electrode 650 contacts only glass layers 607, 609, and 611. In this fashion, it may be seen that the FIG. 6 embodiment operates much like the embodiment shown in FIG. 2, except that single extended electrodes 640 and 650 are used rather than a number of separate electrodes. As in the FIG. 2 embodiment, by positioning the electrodes in this fashion, it is possible to avoid having sodium compounds form across an interface between the 11 major surfaces of the adjacent layers. Rather, the sodium compounds 660 will form only where the extended electrode 650 is contacting the glass.

In the foregoing description, "glass" has been referred to generically and may be selected from any one of a number of different kinds of glass known in the art, or for that matter different kinds of glass which may be developed in the future. In addition, while silicon has been mentioned as the material involved in one of the anodically-bonded layers; this silicon may have only sufficient impurities or doping to permit adequate charge transfer or may be highly doped. Other conductive materials, including but not limited to other semiconductor materials, or metals, may be used, as previously mentioned herein. Clearly the number of layers to be anodically bonded may vary as desired. Moreover, while more silicon layers than glass layers are depicted in the foregoing examples, once again the invention is not so limited. Interleaving of layers of different materials per se is what is important.

While the invention has been described in detail above with reference to several embodiments, various modifications within the scope and spirit of the invention will be apparent to those of working skill in this technological field. Accordingly, the scope of the invention should be measured by the appended claims.

What is claimed is:

1. A method of anodic bonding at least one layer of conductive material to at least one layer of a second material which is capable of forming an electrochemical cell in combination with said layer of conductive material, said method comprising:
   a) providing a stack of layers, including said at least one layer of conductive material and said at least one layer of a second material;
   b) contacting layers to be bonded within said stack of layers with electrodes in a manner such that cations formed during said bonding are directed away from a critical bonding surface; and
   c) anodically bonding said at least one layer of conductive material and said at least one layer of a second material, wherein a plurality of vertically stacked electrochemical cells are formed, and wherein each layer in said stack of layers is in contact with an electrode.

2. A method according to claim 1, wherein said electrodes are contacted with layers to be bonded in a manner such that a contamination surface of said layer of a second material to which said cations are directed, or upon which compounds of said cations are formed during said bonding, can be removed, or such that said contamination surface can be cleaned to remove said compounds, or such that said contamination surface is located relative to said critical bonding surface in a manner such that said contamination surface does not affect the function of a device which includes said critical bonding surface.

3. A method according to claim 2, wherein said stack of layers comprises alternating layers of said conductive material and said second material, and wherein said alternating layers are bonded using a combination of contacting electrodes which contact each alternating layer separately.

4. A method according to claim 3, wherein each alternating layer is contacted separately by a separate electrode.

5. A method according to claim 3, wherein each of said layers of conductive material is contacted by an extended contact electrode which does not contact a layer of said second material, and wherein each layer of second material is contacted by an extended contact electrode which does not contact a layer of said conductive material.

6. A method according to claim 3 or claim 4, or claim 5, wherein a contacting electrode contacts a limited area on a major surface of a layer of second material.

7. A method according to claim 3, or claim 4, or claim 5, where a contacting electrode contacts a minor surface of a layer of second material.

8. A method according to claim 1, wherein each electrochemical cell formed is in a parallel circuit with each other electrochemical cell.

9. A method of anodic bonding at least one conductive material layer to at least one glass layer to form a bonded structure, wherein said method comprises:
   a) providing a stack of layers including said at least one conductive material layer and said at least one glass layer;
   b) contacting layers to be bonded within said stack with electrodes in a manner such that sodium ions formed during said bonding are directed away from a critical bonding surface; and
   c) anodically bonding said at least one conductive material layer and said at least one glass layer, wherein a plurality of vertically stacked electrochemical cells are formed, and wherein each layer in said stack of layers is in contact with an electrode.

10. A method according to claim 9, wherein said electrodes are contacted with layers to be bonded in a manner such that a contamination surface of said glass layer to which said sodium ions are directed, or upon which sodium compounds are formed during said bonding, can be removed, or such that said contamination surface can be cleaned to remove said sodium compounds, or such that said contamination surface is located relative to said critical bonding surface in a manner such that said contamination surface does not affect the function of a device which includes said critical bonding surface.

11. A method according to claim 10, wherein said stack of layers comprises alternating layers of said conductive material and glass, and wherein said alternating layers are bonded using a combination of contacting electrodes which contact each alternating layer separately.

12. A method according to claim 11, wherein each alternating layer is contacted separately by a separate electrode.

13. A method according to claim 12, wherein each of said conductive material layers is contacted by an extended contact electrode which does not contact a glass layer, and wherein each glass layer is contacted by an extended contact electrode which does not contact a conductive material layer.

14. A method according to claim 11 or claim 12, or claim 13, where a contacting electrode contacts a limited area on a major surface of a glass layer.

15. A method according to claim 11, or claim 12, or claim 13, where a contacting electrode contacts a minor surface of a glass layer.

16. A method according to claim 9, wherein each electrochemical cell formed is in a parallel circuit with each other electrochemical cell.

17. A method according to claim 9, wherein said conductive material is a semiconductor.

18. A method according to claim 17, wherein said semiconductor comprises silicon.

19. A method according to claim 9, wherein said glass is a borosilicate glass.

20. A method according to claim 19, wherein said anodic bonding is carried out at a temperature ranging from about 300° C. to about 500° C.

21. A method according to claim 19 or claim 20, wherein said anodic bonding is carried out using a DC voltage ranging from about −0.2 kV to about −2.0 kV.

22. A method according to claim 9, wherein said glass is a lithium aluminosilicate-β-quartz glass ceramic.

23. A method according to claim 22, wherein said anodic bonding is carried out at a temperature ranging from about 140° to about 180° C.

24. A method according to claim 22 or claim 23, wherein said anodic bonding is carried out using a DC voltage ranging from about −0.3 kV to about −1.0 kV.

25. A method according to claim 9, wherein said conductive material is a metal.

26. A method according to claim 19 or claim 22, wherein said conductive material is a metal.

27. The method of claim 9, wherein said bonded structure comprises at least three conductive material layers and at least two glass layers.

28. A method of anodic bonding at least one layer of a conductive material to at least one layer of a second material which is capable of forming an electrochemical cell in combination with said layer of conductive material, wherein said method comprises:

a) providing a stack of layers including said at least one layer of conductive material and said at least one layer of a second material;

b) contacting each layer to be bonded within said stack of layers with an electrode; and c) anodically bonding said at least one layer of conductive material and said at least one layer of a second material employing a plurality of stacked electrochemical cells.

29. A method according to claim 28, wherein layers to be bonded within said stack of layers are each contacted with an electrode in a manner such that cations formed during said anodic bonding are directed away from a critical bonding surface.

30. A method according to claim 29, wherein said electrodes are contacted with layers to be bonded in a manner such that a surface contaminated with compounds formed from said cations is directed away from a critical bonding surface or can be removed.

31. A method according to claim 29, wherein said electrodes are contacted with layers to be bonded in a manner such that a surface contaminated with compounds formed from said cations is located relative to a critical bonding surface such that said contaminated surface does not affect the function of a device which includes said critical bonding surface.

32. A method according to claim 29, wherein said stack of layers comprises alternating layers of said conductive material and said second material, and wherein said alternating layers are bonded using a combination of contacting electrodes which contact each alternating layer separately.

33. A method according to claim 30 or claim 31, wherein a contacting electrode contact s a limited area on a major surface of a layer to be bonded.

34. A method according to claim 30, or claim 31, wherein a contacting electrode contacts a minor surface of a layer to be bonded.

* * * * *